Sept. 2, 1969  H. C. MORTON  3,464,882
ANTIFRICTION BEARING ELEMENT
Filed Jan. 21, 1965
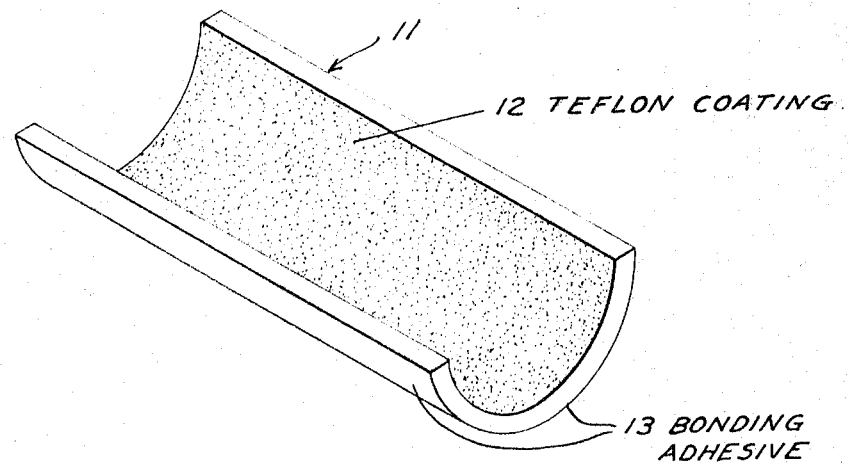
INVENTOR
HENRY C. MORTON
BY
ATTORNEY United States Patent Office 3,464,882
Patented Sept. 2, 1969

3,464,882
ANTIFRICTION BEARING ELEMENT
Henry C. Morton, Branford, Conn., assignor to The Russell Manufacturing Company, Middletown, Conn., a corporation of Connecticut
Filed Jan. 21, 1965, Ser. No. 427,073
Int. Cl. D04h 1/58; B32b 27/04, 5/28
U.S. Cl. 161—151                                    2 Claims

ABSTRACT OF THE DISCLOSURE

A bearing formed by impregnating fibers with a thermosetting resin, partially curing the resin into the "B" state, comminuting the impregnated fibers, cold molding the comminuted fibers to form a self-supporting, rigid bearing preform, providing at least a surface coating of polytetrafluoroethylene and curing the preform to the rigid heat set state.

This invention relates to low friction bearings and more particularly to a bearing block having a low friction surface composed at least in part of a polyfluorocarbon resin.

As object is to provide a bearing of the above type having novel and improved characteristics.

Another object is to provide an improved and efficient method for making and assembling such a bearing.

Another object is to provide a bearing of the above type which is suited for commercial production and use.

Various other objects and advantages will be apparent as the nature of the invention is more fully disclosed.

In accordance with one embodiment of the invention the bearing is composed of a block of resin impregnated fibers molded and set in the form of a backing element and having a bearing surface composed of a polyfluorocarbon resin which may be mixed with a small percentage of other low friction material such as graphite or molybdenum sulphide. This surface coating is embedded in and bonded to the backing material. The back surface of the resin block may carry an adhesive which is capable of bonding to a support such as a metal stamping which is to be mounted in the bearing housing.

Bearings of the above type are suitable for use as ball joint suspensions or as sleeve bearings which are subject to relatively heavy loads. They may be preformed into hemispherical of semicylindrical shape as desired.

The nature of the invention will be better understood from the following description, taken in connection with the accompanying drawing in which a specific example has been set forth for purposes of illustration.

In the drawing:

The figure is a perspective view of a bearing block of semicylindrical form embodying the invention.

In one embodiment the bearing block 11 is made by impregnating yarn or fibers composed of a suitable material such as cotton, jute, hemp, Dacron, Orlon or the like, with a phenolic resin in asolvent carrier or other resin varnish to an amount of 50 to 60 percent by weight of the fibers. The solvent is then removed and the material heated to convert the resin to the B state in which the resin is nontacky but is only partially cured. In this state the material can be readily handled prior to subsequent processing.

The impregnated fibers are then chopped or macerated into short lengths such as one eighth to five sixteenths of an inch. A predetermined quantity of these particles is then cold molded under a compacting pressure of 2000 to 3000 lbs. per sq. in. into the shape of the bearing preform 11. During this cold molding the particles are adhered together to an extent such that the preform can be readily handled and is compacted to a dense, rigid structure.

The bearing surface of the preform is now coated by painting or spraying with a solution of a polyfluorocarbon resin such as Teflon which may have incorporated therein from five to twenty five percent of graphite or molybdenum sulphide powder. The solvent is then removed to leave a coating of polytetrafluoroethylene on the bearing surface 12 which becomes embedded in the resin of the backing material.

A coating 13 of a bonding nitrile-phenolic adhesive or an epoxy bonding resin may be applied to the rear surface of the preform 11 for bonding the preform to a metal stamping when the block 11 is finally cured.

The preform 11 together with the stamping is then placed in a die having an inner member conforming to the ball or shaft with which the bearing is to be used and heated under a pressure of from 2000 to 3000 lbs. per sq. in. at a temperature of 300 to 400° F. for 7 or 8 minutes to finally cure and heat set the resin and to bond the block to the metal stamping. The bearing is then ready to be inserted in a housing for use. The Teflon is prevented from cold flow by the resin backing with which it is in contact and forms a low friction surface which is suitable for the purposes above mentioned.

As a further example, the mix for making the preform may be made by converting a mass of phenolic resin into B state, grinding or comminuting it into particle form and tumbling the particles with cut yarn or fiber to impregnate the same. A predetermined quantity of the impregnated mix may then be cold molded into a preform as above described.

If a bearing of higher strength is required, short lengths of metal fibers can be incorporated in the mix.

In certain instances fully polymerised Teflon powder in comminuted form may be incorporated in proportions of five to fifty percent in the resin fiber mix before the preform is molded in which case the Teflon is trapped within the thermo-setting resin used in making the resin-fiber mix, during the final setting operation. The Teflon thus is impregnated throughout the mass and becomes exposed on the surface as the bearing wears away in use.

The above procedure permits the use of an inexpensive fiber as the base for the bearing block and also provides a preform which can be shaped and conformed to the bearing member in the final curing and heat setting step.

The block has been described as composed of a phenolic resin. However, other resins such as melamine, or isocyanates, or epoxy resins, may be used, depending upon the end use to which the bearing is to be applied.

What is claimed is:

1. A bearing comprising a rigid backing element, and a bearing element in the form of a block composed of a thermosetting resin in the cured and heat set state secured thereto and having a bearing surface, said block being made from a preform composed of fibers impregnated with a thermosetting resin in the partially cured B state, said impregnated fibers being comminuted, and cold molded into a self-supporting rigid state, at least said bearing surface being coated with polytetrafluoroethylene.

2. A bearing as set forth in claim 1 in which a fully polymerized polyfluorocarbon resin is disposed throughout said first resin.

References Cited

UNITED STATES PATENTS

| | | | |
|---|---|---|---|
| 2,798,005 | 7/1957 | Love. | |
| 2,828,236 | 3/1958 | West | 156—330 |
| 3,121,656 | 2/1964 | Gluck | 161—169 |
| 3,151,015 | 9/1964 | Griffith | 161—158 |
| 3,238,601 | 3/1966 | White | 161—158 |

MORRIS SUSSMAN, Primary Examiner

U.S. Cl. X.R.

161—158, 189; 156—333; 308—6; 117—161